United States Patent

Kuromitsu

[15] 3,692,367
[45] Sept. 19, 1972

[54] BRAKING FORCE CONTROL VALVE ASSEMBLY

[72] Inventor: Hiromu Kuromitsu, Kariya Aichi Prefecture, Japan

[73] Assignee: Aisin Seiki Kabushiki, Kaisha, Kariya Aichi Pref., Japan

[22] Filed: April 16, 1971

[21] Appl. No.: 134,779

[30] Foreign Application Priority Data

April 17, 1970  Japan ..................... 45/33254

[52] U.S. Cl. .............. 303/52, 137/596.2, 137/627.5, 303/10, 303/54
[51] Int. Cl. ...................... B60t 13/14, B60t 15/04
[58] Field of Search ...303/52, 53, 54, 10; 137/596.2, 137/627.5

[56] References Cited

UNITED STATES PATENTS 3,147,047   9/1964   Fites .......................... 303/52

*Primary Examiner*—Milton Buchler
*Assistant Examiner*—John J. McLaughlin
*Attorney*—Sughrue, Rothwell, Mion, Zinn & Macpeak

[57] ABSTRACT

This invention relates to improvements in and relating to brake force control valve assemblies. More specifically, it relates to a brake force control mechanism to be used in such a hydraulic brake system wherein accumulated pressure fluid is conveyed from accumulator means through a control valve to wheel brake cylinders. In the inventive brake control valve assembly, a cylinder body thereof is formed with a stepped axial bore comprising a larger bore part and a smaller bore part. A hydraulic piston operatively connected with a brake pedal is slidably mounted in said larger cylinder bore part, said piston being formed with an axial bore. A first valve slider and a second valve slider are mounted slidably in the piston bore in an opposite arrangement to each other and a valve ball is positioned between the valve sliders with idle gaps. When the brake is actuated, these valve sliders and the ball valve acts as if they be rigid to each other, so as to establish a non-time-lag operation of these valve sliders.

7 Claims, 2 Drawing Figures

PATENTED SEP 19 1972  3,692,367

INVENTOR
HIROMU KUROMITSU
BY Sughrue, Rothwell, Mion, Zinn & Macpeak
ATTORNEYS

BRAKING FORCE CONTROL VALVE ASSEMBLY

This invention relates to improvements in and relating to brake force control valve assemblies. More specifically, it relates to a brake force control mechanism to be used in such a hydraulic brake system wherein accumulated pressure fluid is conveyed from accumulator means through a control valve to wheel brake cylinders.

In the conventional control valve assembly of the tandem type, two valves are arranged to direct in one and the same direction. Respective reservoir chambers are provided for these valves. Rather rarely, however, a single reservoir chamber is provided to these two valves. The conventional such control valve assembly represents, however, a highly complicated structure.

Although this drawback be assumed to tolerate, a further substantial drawback resides in a operational retardation between the first valve and the second valve.

It is a conventional measure to provide a spring between the both valves. This results in that the second valve creates a lower hydraulic pressure than that created by the first valve. The object of the present invention resides in the provision of an improved control valve assembly which can obviate these various conventional drawbacks at least to a substantial degree.

These and further objects, features and advantages of the present invention will become more apparent when read the following detailed description of the invention to be set forth hereinbelow by reference to the accompanying drawing illustrating substantially preferred embodiment of the invention.

Figure 1:
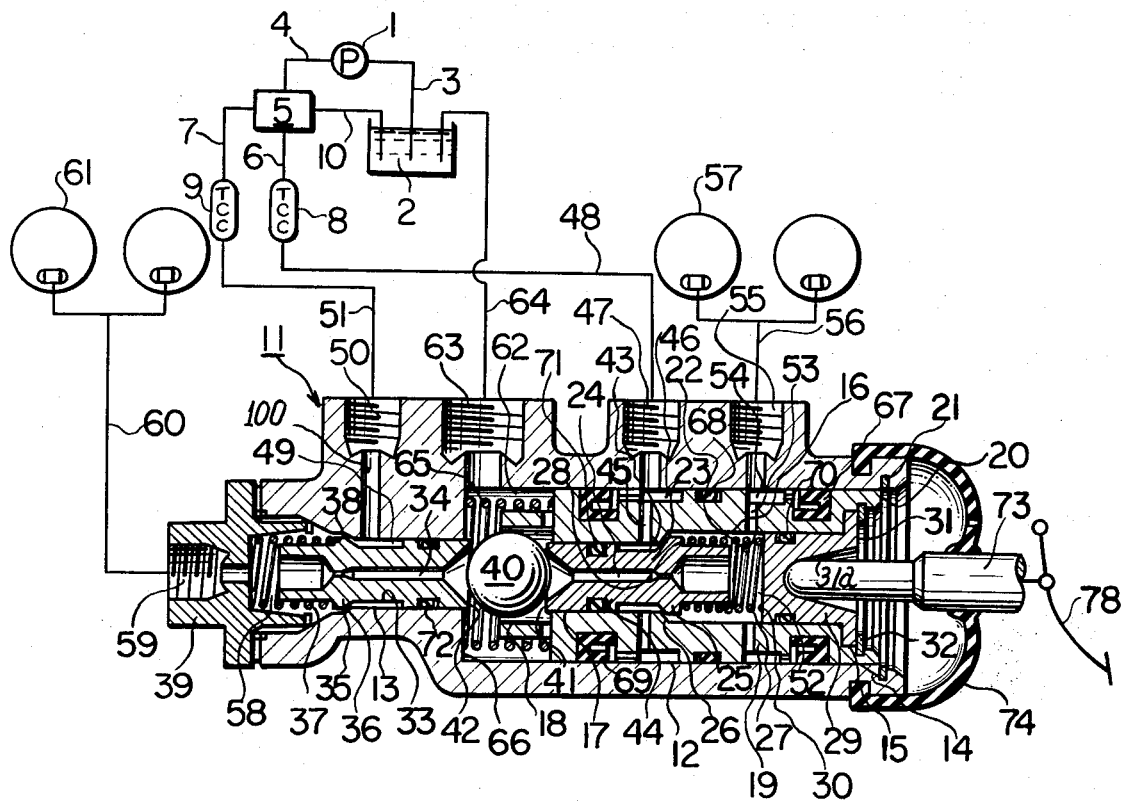
FIG. 1 is an axially sectional view of the brake force control mechanism, wherein, however, an automotive brake system in which said mechanism is provided is shown additionally and schematically.

Referring now to FIG. 1 of the accompanying drawing, numeral 1 represents a pump which sucks oil from a reservoir 2 through a suction piping 3 and delivers it through a delivery piping 4 to a charge valve 5 of known structure. This valve 5 is connected through respective connection pipes 6 and 7 to first and second accumulators 8 and 9 shown only schematically. The charge valve 5 and the related pipe connections including a return pipe 10 are so designed and arranged as commonly known to those skilled in the art that accumulators 8 and 9 are charged with pressure oil to a certain predetermined pressure level and excess oil, when the charge pressure should exceed said level, will be returned through return pipe 10 to reservoir 2. In addition, the valve 5 so operates as known per se that it serves as an isolating valve, should a pipe burst or the like substantial cause of oil leakage happen to take place in the related piping system to be described which is hydraulically connected with either the first accumulator 8 or the second accumulator 9. The isolating valve operates in such case that it cuts off oil delivery to the disabled piping system, while maintaining oil delivery to the other or regularly acting piping system.

Numeral 11 represents a stationary control valve body which is formed with a stepped cylindrical bore comprising a larger bore part 12, a smaller bore part 13 and a flared part 14.

In the larger bore part 12, a hydraulic piston 19 is slidably and sealedly mounted, said piston comprising a largest diameter piston part 15, a middle diameter piston part 16, a smallest diameter piston part 17 and a hollow concentric holder part 18 made integral one after another. The right-hand end 20, FIG. 1, of piston 19 is kept normally in pressure contact with a snap ring 21 detachably mounted in the inner wall surface of the flared cylinder part 14. The piston 19 is bored axially and centrally with a stepped bore 22 which receives a first valve slider 23 having a stepped axial bore 24.

First valve slider 23 is formed at its right-hand end with an enlarged valve head 25 which is normally kept in pressure contact with a valve seat 26 formed at an inside shoulder on the piston 19. For this purpose, a coil spring is inserted under certain precompressed condition between a shoulder 28 formed on said valve head 25 and the inner end wall 30 of first plug member 29 which is realingly retained at the right-hand end of said bore 22 of piston 19. The enlarged right-hand end 31 of plug member 29 is normally kept in pressure contact with a snap ring 32 which is detachably mounted in the inside wall surface of largest piston part 15.

Second valve slider 33 is slidably mounted in the smallest cylinder bore 13, said slider being formed with a stepped central and axial bore 34. The left-hand end of the slider 33 is formed into a valve head 35 which is normally kept in pressure contact with a valve seat 36 under the influence of valve spring 37, said seat being formed as an inclined shoulder on the inner wall of said cylinder bore 33. The spring 37 abuts by its one end against a shoulder 38 formed on valve head 35 and by its opposite end against second plug 39 screwed in the control valve body 11.

Holder part 18 contains movably a ball member 40 which is kept in position normally with idle gaps with a first cone-shaped valve seat 41 formed in first valve slider 23, and with a similarly cone-shaped valve seat 42 formed in second valve slider 33, respectively. In the operation, however, the ball member 40 is kept in sealing contact with these valve seats 41 and 42, respectively, as will become more clear as the description proceeds.

At an intermediate point between the both end extremities, first valve slider 23 is formed in its outer peripheral surface with a ring recess 43, so as to provide an intermediate chamber by cooperation with the inside wall surface of piston bore 22. This chamber 43 is defined at its left-hand end by a land 44 formed on the first valve slider and at its right-hand end by the sealing part of said valve head 25 when the latter sealingly cooperates with the mating seat 26. It should be noted that in this way the cross-sectional area at the land 44 and that of the sealing part of the valve head 25 is designed to be equal to each other.

From the foregoing, it will be seen that even when pressure liquid is filled in said chamber 43, the hydraulic pressure force acting upon first valve slider 23 is kept in balance in both axial directions thereof, thus the slider 23 will not hydraulically urged by the pressure liquid in the chamber 43. Therefore, at this stage, the slider 23 is urged exclusively by the spring force at 27 acting in the leftward direction in FIG. 1.

The chamber 43 communicates hydraulically through a lateral passage 45 formed in the piston 19 with a ring chamber 46 formed in the outer peripheral surface of piston 19, thence through a port 47 and a piping 48 connected therewith, with said first accumulator 8.

A similar ring chamber 49 is formed on the outer peripheral surface of second valve slider 33 at an intermediate point between its both ends, as in the similar way as said chamber 43, and communicates hydraulically through lateral passage 100 and a port 50 formed in the body 11 and a piping 51 connected with said port, with second accumulator 9.

A chamber 52 defined by a part of the bore 22 communicates hydraulically through a lateral passage 53 formed in the piston 19, with a ring chamber 54 formed on the outer periphery thereof, thence through a port 55 and a piping 56 to front wheel brake cylinders 57, only schematically shown.

A hydraulic chamber 58 defined substantially between second plug 39 and second valve slider 33, is hydraulically connected through a port 59 and piping 60 to rear wheel brake cylinders 61 which are shown only schematically again.

A reservoir chamber 62 formed in the larger cylinder part 12, is hydraulically connected through a port 63 and a piping 64 to said reservoir 2.

A spring is provided in said reservoir chamber 62 and kept in its precompressed state between on a shoulder 66 formed in the control apparatus 11, on the one hand, and the inner end of said piston 19, on the other hand, thereby the latter being urged to move rightwards in FIG. 1.

Sealing rings 67, 68 and 69 are provided at suitably selected places between said piston 19 and the large diameter cylinder part 12 for providing effective seal therebetween.

A further sealing ring 70 is provided between the first plug 29 and the middle diameter piston part 16 for providing effective seal therebetween. A sealing ring 71 is provided between the first valve slider 23 and the small diameter piston part 17. A still further sealing ring 72 between the second valve slider 33 and the smaller cylinder part 13, for providing effective seal therebetween.

A push rod 73 partly shown schematically is operatively connected by its outer end with a conventional foot-operated brake pedal 78, and by its inner end with saud first plug 29, as shown. For receiving the inner end of push rod 73 in a tongue-and-groove relationship and for the above purpose, the plug 29 is formed with a substantially cone-shaped axial recess 31a. For avoiding disadvaltageous invasion of dusts and moisture from outside into inside of the control valve assembly, there is provided a resilient dust cover 74 which is fixedly attached to the body 11 and the push rod 73, as is clearly demonstrated.

Figure 2:
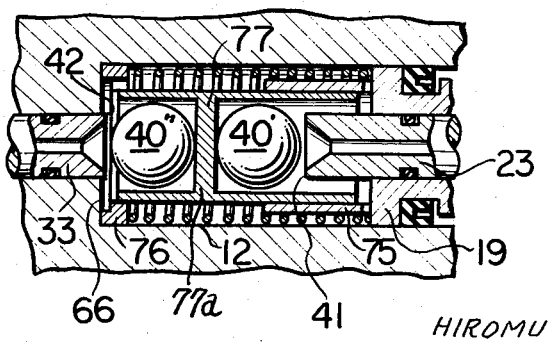
FIG. 2 represents in axial section several working parts of a slight modification from the brake force control mechanism. shown in FIG. 1.

In a modification shown in FIG. 2, numeral 75 represents a cylindrical and concentric first guide member which is rigid with the hydraulic piston 19. Numeral 76 represents a ring-shaped second guide member which is rigid with the larger cylinder part 12 and the shoulder 66. Numeral 77 represents a movable holder member which has an I-configuration in its axial section as shown and is slidably guided by said first and second guide members 75 and 76. This holder 77 movably two ball members 40′ and 40″ separated from each other by a separating wall 77a forming a part of said holder member 77. When the control valve assembly is actuated first ball 40′ is brought into its seated position on the seat 41 on said first valve slider 23 and second ball 41″ is brought into its seated position on the seat 42 on said second valve slider 33.

The operation of the control valve assembly so far shown and described is as follows:

When the automtive driver actuates the pedal 78, motion is transmitted therefrom through push rod 73 to first plug 29 and thus to piston 19 which is thus moved leftwards in FIG. 1. In this way, spring 27 is urged in its further compressing direction and the first valve slider 23 kept in its seated position by its valve head on the seat 26 will be also moved in the leftward direction. In this way, ball 40 is kept in pressure contact with both seats 41 and 42.

With further actuation of said brake pedal of said brake pedal 78, valve heads 25 and 35 are brought in their disengaged position from their respective mating seats, and therefore, the chambers 43 and 52 and are brought into fluid communication with each other the chambers 49 and 58 are brought again into mutual fluid communication. Therefore, pressure liquid will be conveyed from accumulator 8 through chambers 43, 52, passage 53, chamber 54, port 55 and piping 56 to front wheel cylinders 57. In the similar way, pressure liquid will be delivered from accumulator 9 through chambers 49; 58, port 59 and piping 60 to rear wheel cylinders 61. Therefore, all four vehicle wheels are subjected to hydraulic braking action.

When foot pressure is released from application on the pedal 78, piston 19 is moved rightwards under the action of spring 65, thereby valve heads 25 and 35 being brought into pressure and sealing contact with their respective mating seats. Communication between chambers 43 and 52; and 49 and 58 will thus be interrupted, respectively. Ball 40 is then brought into its disengaging position from contact with seats 41 and 42. Pressure liquid is thus returned from wheel cylinders 57 through the bore 24 to reservoir chamber 62. In the similar way, pressure liquid is returned from wheel cylinders 61 through bore 34 to reservoir chamber 62. Thence, the thus collected pressure liquid will be conveyed through port 63 and piping 64 to reservoir 2.

When the hydraulic system relating with first accumulator be disabled by the loss of prevailing liquid pressure and under these conditions, the driver operates the pedal 78, the ball 40 will become in its pressure and sealing contact with valve seats 41 and 42 and the valve heads 25 and 35 are brought into disengagement from respective valve seats 26 and 36 concurrently. Although pressure oil will flow out therefrom in an ineffective manner, the pressure liquid contained in the second accumulator 9 will be conveyed to wheel cylinders 61. The pressure liquid conveyed to the chamber 58 will act so that valve heads 35 and valve seat 36 are closed again with each other. But, with further continued actuation of brake pedal 78, ball 40 is brought into pressure contact with the left-hand end of piston 19 and thence, the disengagement valve head 35 from valve seat 36 is positively maintained and the wheel cylinders 61 are subjected to braking action by virtue of the pressure liquid conveyed from second accumulator 9 thereto.

As a further example, when the hydraulic system relating to second accumulator 9 should be disabled by a loss of pressure maintenance, as invited by a pipe burst or the like cause, valve heads 25 and 35 are brought again into disengagement from their respective seats, respectively. While pressure liquid is delivered only ineffectively from the accumulator 9, the pressure liquid conveyed to the chamber 52 will bring these valve heads again into closing position. But, by continuing the actuation of brake pedal 78, ball 40 is brought into pressure contact with shoulder 66, thereby preventing leftward movement of first valve slider 23 and maintaining the disc engaged position of valve head 25 from its mating seat 26. In this way, wheel cylinders 57 will be subjected to braking action under the influence of liquid pressure supplied from first accumulator.

It will be easily seen that with modified arrangement shown in FIG. 2, similar operations may be brought about substantially in the similar way.

As has been clearly shown and demonstrated that in the foregoing embodiment, two valves 23 and 33 are arranged in an opposed way and a ball member as at 40 is arranged between these valves 23 and 33 and thus, when the brake is actuated, valves 23 and 33 and ball 40 will act as if they be rigid to each other. In this way, otherwise possible and conventionally encountered operational time lag between these two valves and a pressure differential frequently caused to existence thereby, can be obviated to a substantial degree. By the sole provision of a single reservoir chamber as at 62 and at the place where the ball 40 exists, respective pressure liquid can be returned to the reservoir in a simple and compact design of the control valve assembly and without any difficult. These merits does provides remarkable progress in the art.

As is easily seen, the main difference of the modification shown in FIG. 2 from the main embodiment shown in FIG. 1 resides in the provision of two balls 40' and 40'' in place of the sole one at 40. Therefore, a high precision in the concentricity of several related parts can be lessened to a substantial degree with preservation of equal sealing effect as before.

Additionally, as seen from the drawing, an orifice is provided in the passage means formed in the first and second valve means. These orifices are adapted for throttling the liquid flow returning from respective front or rear wheel cylinders to the reservoir. This kind of throttling means has shown that it contribute substantially to reduce otherwise apparent vibration of the first and second valve means during performing their operational function.

The embodiments of the invention in which an exclusive property or privilege is claimed are as follows:

1. A brake force control valve assembly, comprising in combination:

a cylinder body having a larger axial bore and a smaller axial bore formed therein;

a hydraulic piston slidably received in said larger cylinder bore and having in turn an axial bore formed therein and adapted for being actuated in response to the movement of a manually operated means.

a resilient means for energizing said piston against the movement of said manually-operated means;

a first valve means slidably mounted in said bore in said piston and adapted for actuation in response to movement of said piston, said first valve means serving for on-off controlling fluid communication between a first hydraulic pressure source and a first brake means;

a second valve means slidably mounted in said smaller bore and in an opposing relationship to said first valve means and adapted for on-off control of fluid communication between a second liquid pressure source and a second brake means;

a chamber formed between said first and said second valve means and kept in fluid communication with a reservoir;

passage means formed respectively in said first and said second valve means for establishing liquid communication between said chamber and said brake means; and a third valve means provided in said chamber for on-off control of said passage means.

2. Control valve assembly as claimed in claim 1, wherein said first valve means constitutes a valving relationship by cooperation with said piston, said valving relationship being normally kept in its closing state under the action of a spring having one end thereof mounted on said piston so as to interrupt liquid communication between said one liquid pressure source and said one brake means and said second valve means establishes a valving relationship by cooperation with said smaller cylinder part, said valving relationship being normally kept in its closing state under the influence of a further spring one of which is mounted on said cylinder body, so as to interrupt liquid communication between said other liquid pressure source and said other brake means; and further, said third valve means establishes a valving relationship by cooperation with said first and second valve means, said valving relationship being kept normally in its opening state, so as to communicate said reservoir with the both brake means.

3. Control valve assembly as claimed in claim 1, wherein said third valve means constituted by a ball valve means.

4. Control valve assembly as claimed in claim 3, further comprising a cylindrical holder member made rigid with said piston and holding said ball valve means.

5. Control valve assembly as claimed in claim 3, further comprising a holder member for holding therein said third valve means which comprises a pair of ball valve means which are movably kept in said holder member and adapted for cooperation respectively with said first and second valve means.

6. Control valve assembly as claimed in claim 1, wherein an orifice means is provided in each of said passage means formed respectively in said first and second valve means.

7. Control valve assembly as claimed in claim 1, wherein said third valve means is brought into contact with the inner end of said piston with said one liquid pressure source disabled, and said third valve means is brought into contact with the inner end of said smaller cylinder part with said other liquid pressure source disabled.

* * * * *